(12) United States Patent  
Watanabe

(10) Patent No.: US 8,995,858 B2  
(45) Date of Patent: Mar. 31, 2015

(54) POWER SUPPLY DEVICE AND IMAGE FORMATION APPARATUS

(75) Inventor: Tetsuya Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 205 days.

(21) Appl. No.: 13/159,687

(22) Filed: Jun. 14, 2011

(65) Prior Publication Data

US 2011/0318039 A1 Dec. 29, 2011

(30) Foreign Application Priority Data

Jun. 23, 2010 (JP) ................................ 2010-142223

(51) Int. Cl.
*G03G 15/20* (2006.01)
*G03G 15/00* (2006.01)
*H02M 1/42* (2007.01)

(52) U.S. Cl.
CPC ........ *G03G 15/5004* (2013.01); *G03G 15/2078* (2013.01); *H02M 1/4208* (2013.01); *Y02B 70/126* (2013.01)
USPC .............................................. 399/69; 399/88

(58) Field of Classification Search
None
See application file for complete search history.

(56) References Cited

U.S. PATENT DOCUMENTS

| 5,579,271 A | 11/1996 | Sohn et al. | |
|---|---|---|---|
| 2004/0190923 A1* | 9/2004 | Inukai | 399/67 |
| 2011/0118890 A1* | 5/2011 | Parsons | 700/295 |

FOREIGN PATENT DOCUMENTS

| JP | 03-022732 A | 1/1991 | |
|---|---|---|---|
| JP | 07-046764 A | 2/1995 | |
| JP | 08-273396 A | 10/1996 | |
| JP | 11-187575 A | 7/1999 | |
| JP | 2000-148258 A | 5/2000 | |
| JP | 2000282546 A * | 10/2000 | ............... E03D 9/08 |
| JP | 2003-199336 A | 7/2003 | |
| JP | 2004-040913 A | 2/2004 | |

OTHER PUBLICATIONS

Machine translation of Kunikawa, JP 2004-040913.*
Machine translation of Ueki, JP 2000-282546.*
Horowitz and Hill, The Art of Electronics, Cambridge University Press, 2d Ed. (1999), pp. 44-45.*
Horowitz and Hill, The Art of Electronics, Cambridge University Press, 2d Ed., pp. 595-598 (1989).*
Partial translation of Ueki, JP 2000-282546.*
Annotated partial translation of Ueki, JP 2000-282546.*

* cited by examiner

*Primary Examiner* — David Gray
*Assistant Examiner* — Sevan A Aydin
(74) *Attorney, Agent, or Firm* — Marvin A. Motsenbocker; Mots Law, PLLC

(57) ABSTRACT

A power supply device includes: a power supply part to convert an AC voltage from an AC power source into a direct current and output a DC voltage; a zero cross detector to detect zero cross timings of AC voltage; and a power supply controller to control supply of the AC voltage to the power supply part and the zero cross detector based on the zero cross timing.

13 Claims, 10 Drawing Sheets

POWER SUPPLY DEVICE OF FIRST EMBODIMENT

CIRCUIT CONFIGURATION OF POWER SUPPLY DEVICE IN FIG.1

CIRCUIT CONFIGURATION OF POWER SUPPLY DEVICE IN FIG.8

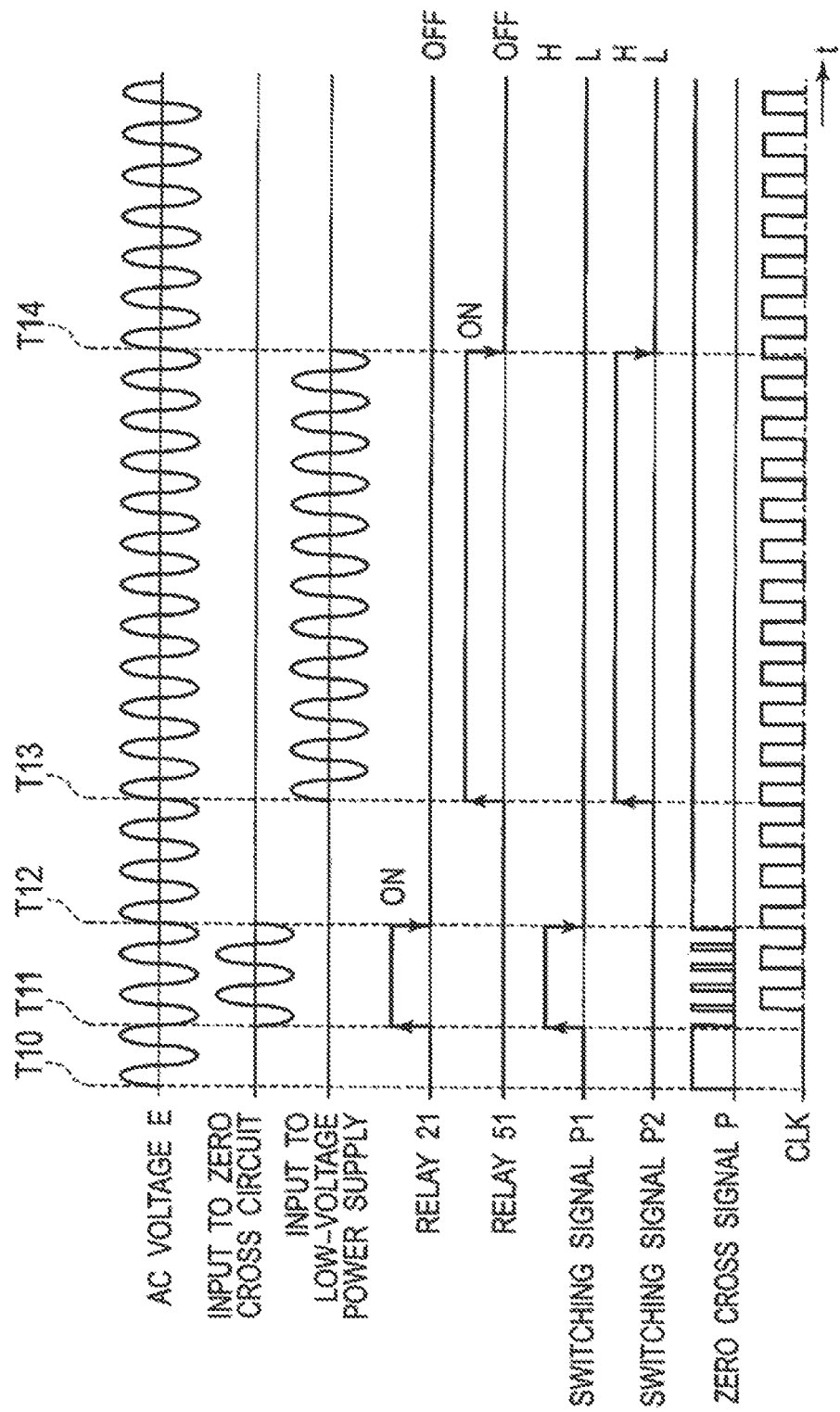

POWER SUPPLY DEVICE AND IMAGE FORMATION APPARATUS

CROSS REFERENCE TO RELATED APPLICATIONS

This application claims priority based on 35 USC 119 from prior Japanese Patent Application No. 2010-142223 filed on Jun. 23, 2010, entitled "Power Supply Device and Image Formation Apparatus having the SAME", the entire contents of which are incorporated herein by reference.

BACKGROUND OF THE INVENTION

1. Field of the Invention

The invention relates to a power supply device to detect zero cross timings of an AC voltage supplied by an alternative-current (hereinafter, referred to as "AC") power source and convert the AC into a direct current (hereinafter, referred to as DC) based on the zero cross timings thereby outputting a predetermined DC voltage and relates to an image formation apparatus having the power supply device.

2. Description of Related Art

A conventional image formation apparatus such as a copy machine, a printer, or a facsimile machine (hereinafter, referred to as "FAX") executes an electric power control with a switching element such as triac, upon driving a heater in a fixation device or the like using an AC power source. The electric power control is executed based on a zero cross signal, which indicates zero cross points of a half-wave of the AC power source wave, as the basis for a timing to turn on the switching element (for example, Japanese Patent Application Laid-Open No. 2004-40913).

SUMMARY OF THE INVENTION

However, it may be a waste to continuously detect the zero cross timings.

An aspect of the invention is a power supply device including: a power supply part to convert an AC voltage of an AC power source into a direct current and output an DC voltage; a zero cross detector to detect zero cross timings of the AC voltage; and a power supply controller to control a supply of the AC voltage to the power supply part and the zero cross detector based on the zero cross timing.

BRIEF DESCRIPTION OF THE DRAWINGS

FIG. 10 is a timechart illustrating the detailed operation in the power supply device of FIG. 9.

DETAILED DESCRIPTION OF THE EMBODIMENTS

Figure 1:
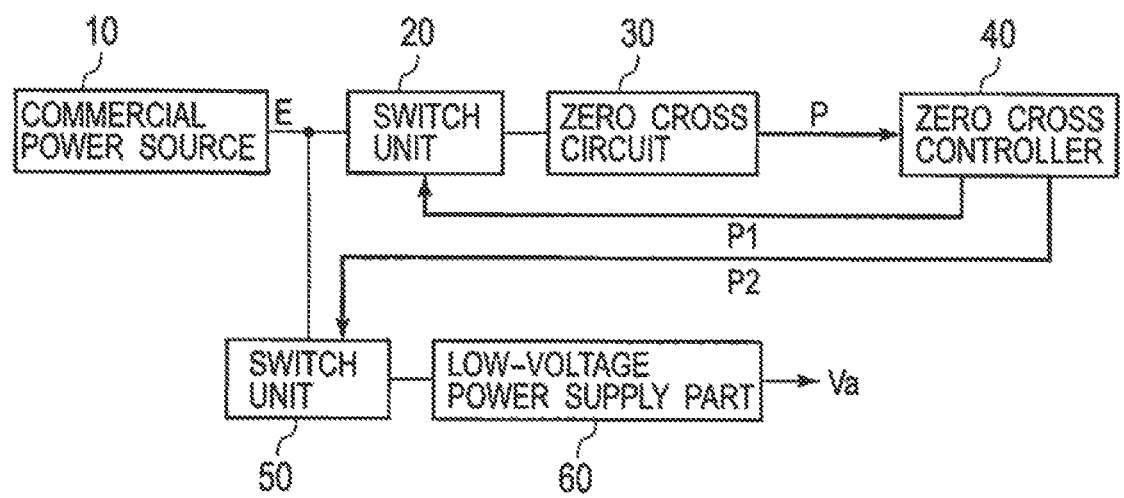
FIG. 1 is a block diagram illustrating the configuration of a power supply device according to a first embodiment of the invention.

Descriptions are provided herein below for embodiments based on the drawings. In the respective drawings referenced herein, the same constituents are designated by the same reference numerals and duplicate explanations concerning the same constituents are omitted. All drawings illustrate the respective examples only.

[First Embodiment]

(Configuration of First Embodiment)

FIG. 1 is a block diagram illustrating the configuration of a power supply device according to a first embodiment of the invention.

The power supply device is used for supplying a control signal or the like to a controller (for example, a heater controlling circuit in a fixation device) in an image formation apparatus such as a copy machine, a printer, a FAX machine, or the like. The power supply device includes commercial power source 10 (AC 100V power source) serving as an AC power source to output AC voltage E. Second switch unit 20 or a second switching unit, zero cross circuit 30 or a zero cross detector, and zero cross controller 40 or a power supply controller are cathode-connected to the output side of commercial power source 10. Power supply part (for example, low-voltage power supply part) 60 is connected to the output side of commercial power source 10 via first switch unit 50 or a first switching unit.

Switch unit 20 is configured to perform an on/off operation based on second switching signal P1 output from zero cross controller 40 thereby switching between supplying or not supplying an AC of commercial power source 10 to zero cross circuit 30. Zero cross circuit 30 detects the zero cross timings of AC voltage E and outputs zero cross signal P to zero cross controller 40. Zero cross controller 40 is configured to, based on zero cross signal P input to zero cross controller 40, output second switching signal P1 to control the on/off operation of switch unit 20, first switching signal P2 to control the on/off operation of switch unit 50, and the like.

Switch unit 50 performs the on/off operation based on switching signal P2 input to switch unit 50 thereby switching between supplying or not supplying the AC of commercial power source 10 to low-voltage power supply part 60. Low-voltage power supply part 60 is configured to convert the supplied AC voltage E into DC and output low DC voltage Va.

Figure 2:
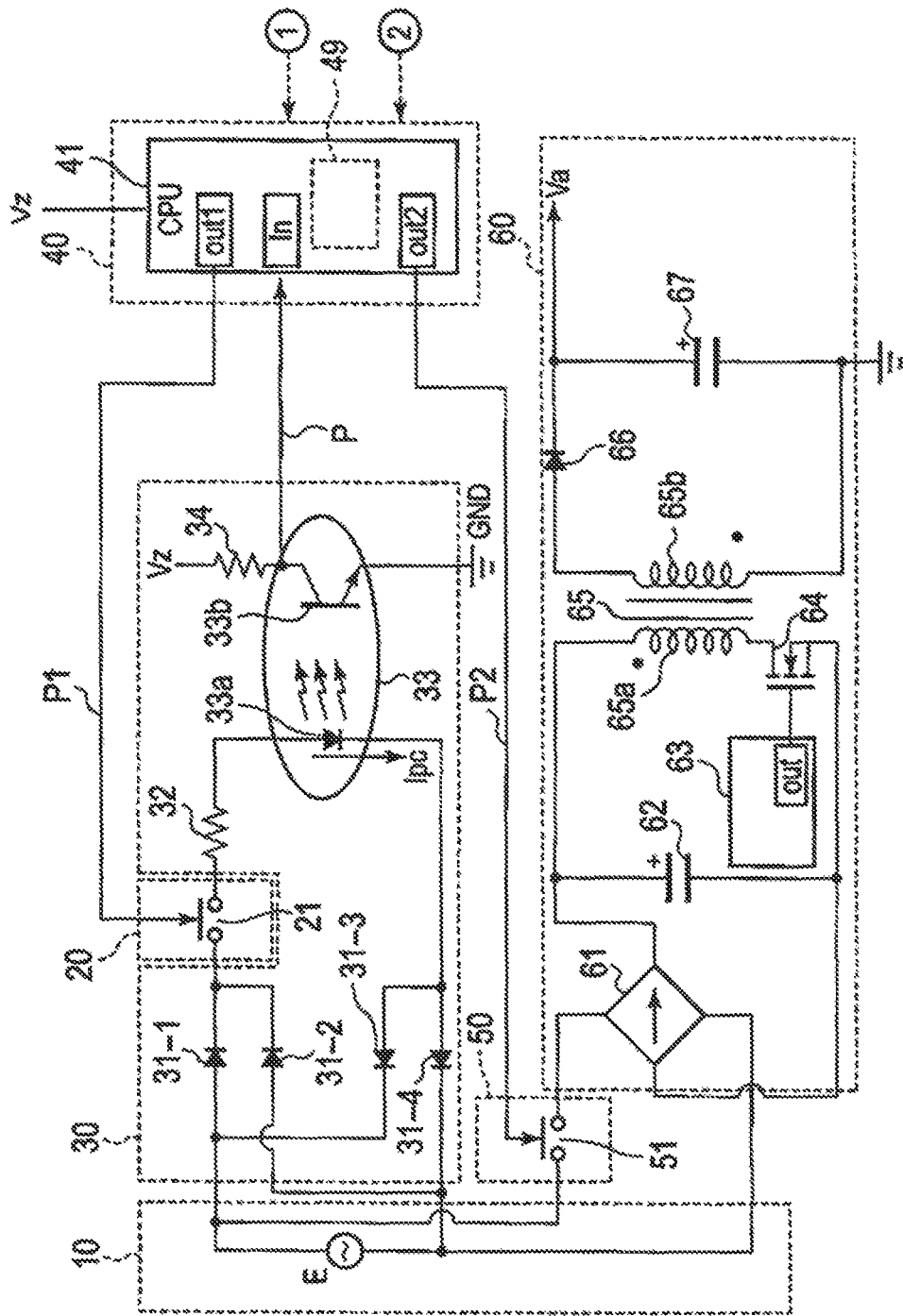
FIG. 2 is a circuit diagram illustrating an example of the configuration of the power supply device shown in FIG. 1.

FIG. 2 is a circuit diagram of a configuration example of the power supply device shown in FIG. 1. AC voltage E is supplied to both switch unit 20 and zero cross circuit 30 from commercial power source 10. Switch unit 20 includes relay 21 serving as a switching element. Relay 21 functions to execute the on/off operation based on switching signal P1.

Zero cross circuit 30 includes four diodes 31-1 to 31-4 to perform a full-wave rectification to obtain a DC voltage from AC voltage E. The cathode side of diodes 31-1 and 31-2 is connected to one end of current-limiting resistor 32 via relay 21. Photo coupler 33 is connected between the other end of current-limiting resistor 32 and the anode side of diodes 31-3 and 31-4. Photo coupler 33 includes: light emitting photodiode 33a connected between the other end of current-limiting resistor 32 and the anode side of diodes 31-3 and 31-4; and phototransistor 33b for receiving the light emitted from photodiode 33. DC voltage Vz from an unillustrated power source is applied to the collector of phototransistor 33b via pull-up resistor 34. The emitter of phototransistor 33b is connected to ground GND. When electric current Ipc flows between the anode and cathode of photodiode 33a, photodiode 33a emits light, which is received by the gate of phototransistor 33b, and the collector of phototransistor 33b thus outputs zero cross signal P.

Zero cross controller 40 is composed of, for example, a central processing unit (hereinafter referred to as "CPU") 41. Zero cross controller 40 has functions, one of which is to calculate the zero cross timing based on zero cross signal P input to input terminal In and, a predetermined time later, to output switching signals P1 and P2 from output terminals OUT1 and OUT2, respectively.

Switch unit 50 includes relay 51 serving as one of switching elements. Relay 51 functions to execute the on/off operation based on switching signal P2 thereby switching between getting through and shutting AC voltage E supplied from commercial power source 10. Low-voltage power supply part 60 is connected to the output side of switch unit 50.

Low-voltage power supply part 60 includes: bridge rectifier diode 61 to full-wave rectify AC voltage E supplied thorough relay 51; smoothing condenser 62 to smooth a rectified voltage that is full-wave rectified by bridge rectifier diode 61, and switch control device 63. Switching element 64 for DC/AC conversion and primary winding 65a of transducer 65 are serially connected to the output side of smoothing condenser 62. Switching element 64 is, for example, a field-effect transistor (hereinafter referred to as "FET") and executes an on/off operation based on a switching signal output from output terminal OUT of switch control device 63. Rectifier diode 66 to rectify the AC voltage output from secondary winding 65b and smoothing condenser 67 to smooth a voltage rectified by rectifier diode 66 and to output lower DC voltage Va (for example, DC 5V) are connected to secondary winding 65b of transducer 65.

(Outline Operation of Power Supply Device According to the First Embodiment)

Figure 3:
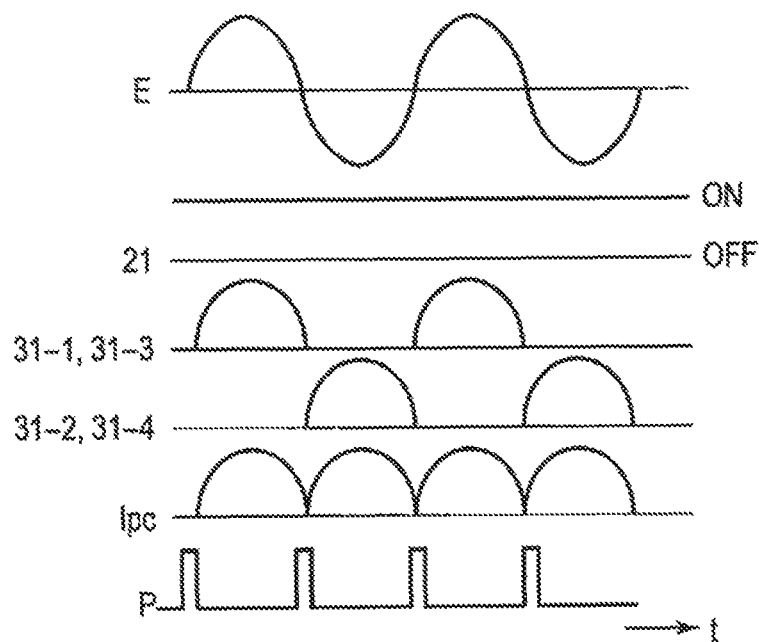
FIG. 3 is a waveform diagram illustrating waveforms upon a zero cross detection (when relay 21 is turned on) in the power supply device of FIG. 2.
Figure 4:
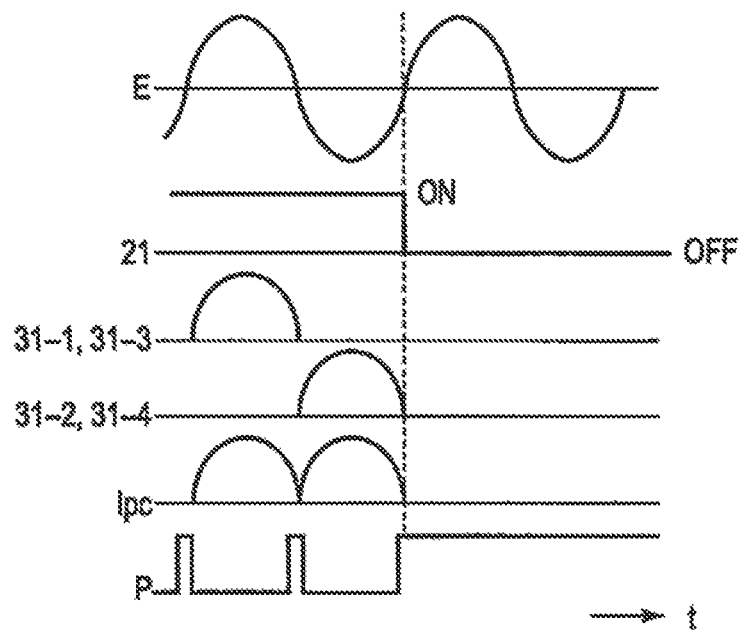
FIG. 4 is a waveform diagram illustrating the waveforms before and after relay 21 is turned off in the power supply device of FIG. 2.

FIG. 3 is a waveform diagram illustrating waveforms upon the zero cross detection (when relay 21 is turned on) in the power supply device of FIG. 2. FIG. 4 is a waveform diagram illustrating the waveforms before and after relay 21 is turned off in the power supply device of FIG. 2. In FIGS. 3 and 4, the horizontal axis indicates time t and the vertical axis indicates the voltages.

As shown in FIG. 3, when relay 21 is turned on in response to switching signal P1 output from output terminal OUT1 of zero cross controller 40, AC voltage E is applied to zero cross circuit 30. With this, electric current Ipc flows from commercial power source 10 through diodes 31-1 and 31-2, relay 21, and current-limiting resistor 32, photo coupler 33, and diodes 31-4 and 31-3 to photodiode 33a of photo coupler 33, and thus photodiode 33a of photo coupler 33 is turned on.

Accordingly, photodiode 33a of photo coupler 33 emits light, which turns on phototransistor 33b. Therefore, zero cross signal P is output as the collector of phototransistor 33b is pulled up with DC voltage Vz and pull-up resistor 34 and thus zero cross signal P is input to input terminal In of zero cross controller 40.

As shown in FIG. 4, at time T, when relay 21 is turned off in response to switching signal P1 output from output terminal OUT1 of zero cross controller 40, the supply of the power to photo coupler 33 is stopped. Therefore, electric current Ipc that flowed through diodes 31-1 to 31-4, current-limiting resistor 32, and photodiode 33a of photo coupler 33 is stopped, and thereby zero cross signal P is not outputted.

When relay 51 is turned on in response to switching signal P2 output form output terminal OUT2 of zero cross controller 40, AC voltage E is applied to low-voltage power supply part 60. Accordingly, AC voltage E is full-wave rectified by bridge rectifier diode 61 in low-voltage power supply part 60, and smoothed by smoothing condenser 62, thereby creating the smoothed DC voltage. Then, switch control device 63 executes switching operation of FET 64 during arbitrarily fluctuating period so as to convert the smoothed DC voltage into a rectangular wave voltage, which creates a rectangular wave current flowing through primary winding 65a of transducer 65. This induces a rectangular wave current flowing through secondary winding 65b of transducer 65. The rectangular wave current is rectified by rectifier diode 66 and then smoothed by smoothing condenser 67, thereby outputting DC voltage Va.

(Detailed Operation of Power Supply Device According to the First Embodiment)

Figure 5:
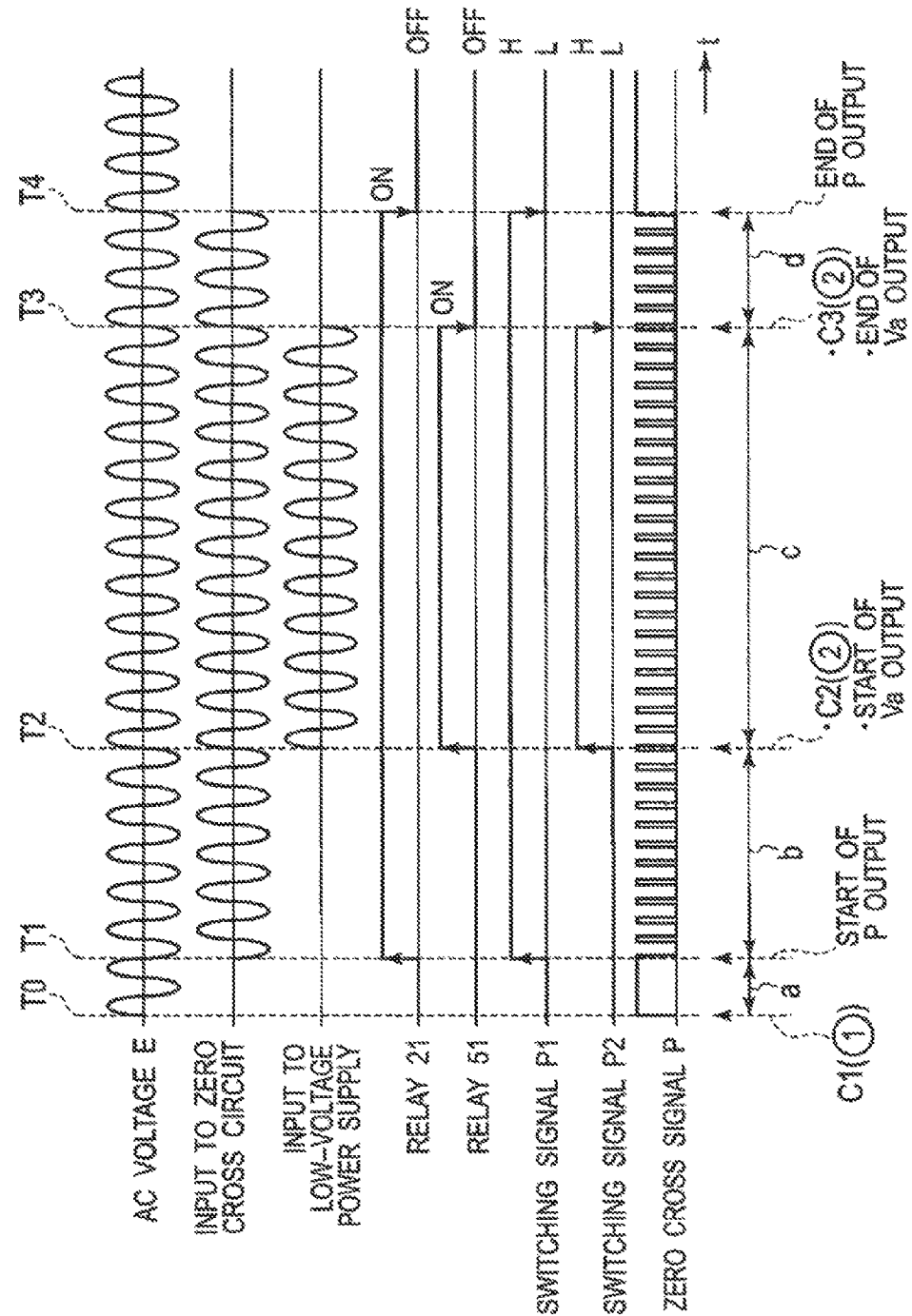
FIG. 5 is a timechart illustrating the detailed operation of the power supply device in FIG. 2.

FIG. 5 is a timechart illustrating detailed operation of the power supply device in FIG. 2. In FIG. 5, the horizontal axis indicates time t and the vertical axis indicates voltages.

Time T0: First, at time T0, a driving electric power is supplied from an unillustarted power source such as a battery or the like to zero cross controller 40, and thus zero cross controller 40 starts to operate.

Time T1: At Time T1, zero cross controller 40 outputs switching signal P1 from output terminal OUT1 to turn on relay 21. Accordingly, AC voltage E is applied to zero cross circuit 30, which causes zero cross circuit 30 to operate. Such zero cross circuit 30 detects the zero cross timing of AC voltage E and outputs zero cross signal P to zero cross controller 40.

Time T2: At Time T2, when the supply of the power to low-voltage power supply part 60 is needed, zero cross controller 40 turns on relay 51 by outputting switching signal P2 based on zero cross signal P input from input terminal In, which causes application of AC voltage E to low-voltage power supply part 60. More specifically, zero cross controller 40 calculates, on the basis of timings of rising edges and falling edges of received zero cross signal P, a timing when a phase angle of AC voltage E is small to turn on relay 51, and then outputs switching signal P2 having a high level (hereinafter referred to as H level) at the calculated timings thereby turning on relay 51. Accordingly, while an incoming current from commercial power source 10 to low-voltage power supply part 60 is suppressed, AC voltage E is applied to low-voltage power supply part 60 and thus low-voltage power supply part 60 outputs DC voltage Va.

Time 3: At Time T3, when DC voltage Va output from low-voltage power supply part 60 is not needed any more, zero cross controller 40 outputs, based on zero cross signal P, switching signal P2 having a low level (hereinafter referred to as "L level"), which turns off relay 51. This shuts off the supply of the power from commercial power source 10 to low-voltage power supply part 60.

Time 4: At Time T4, zero cross controller 40 turns off relay 21 by outputting switching signal P1 of L level, and keeps it until the supply of the power to low-voltage power supply part 60 is needed again. That is, the supply of the power from commercial power source 10 to zero cross circuit 30 is shut off, and, after that, when the supply of the power to low-voltage power supply part 60 is needed again, the process proceeds back to time T1.

(Example of Application of Power Supply Device According to First Embodiment)

For example, the power supply device according to the first embodiment may be applied to an apparatus that needs a power control, a phase control, or the like, such as an image formation apparatus. Next, an application example of the power supply device of the first embodiment in an image formation apparatus will be described.

(Image Formation Apparatus)

Figure 6:
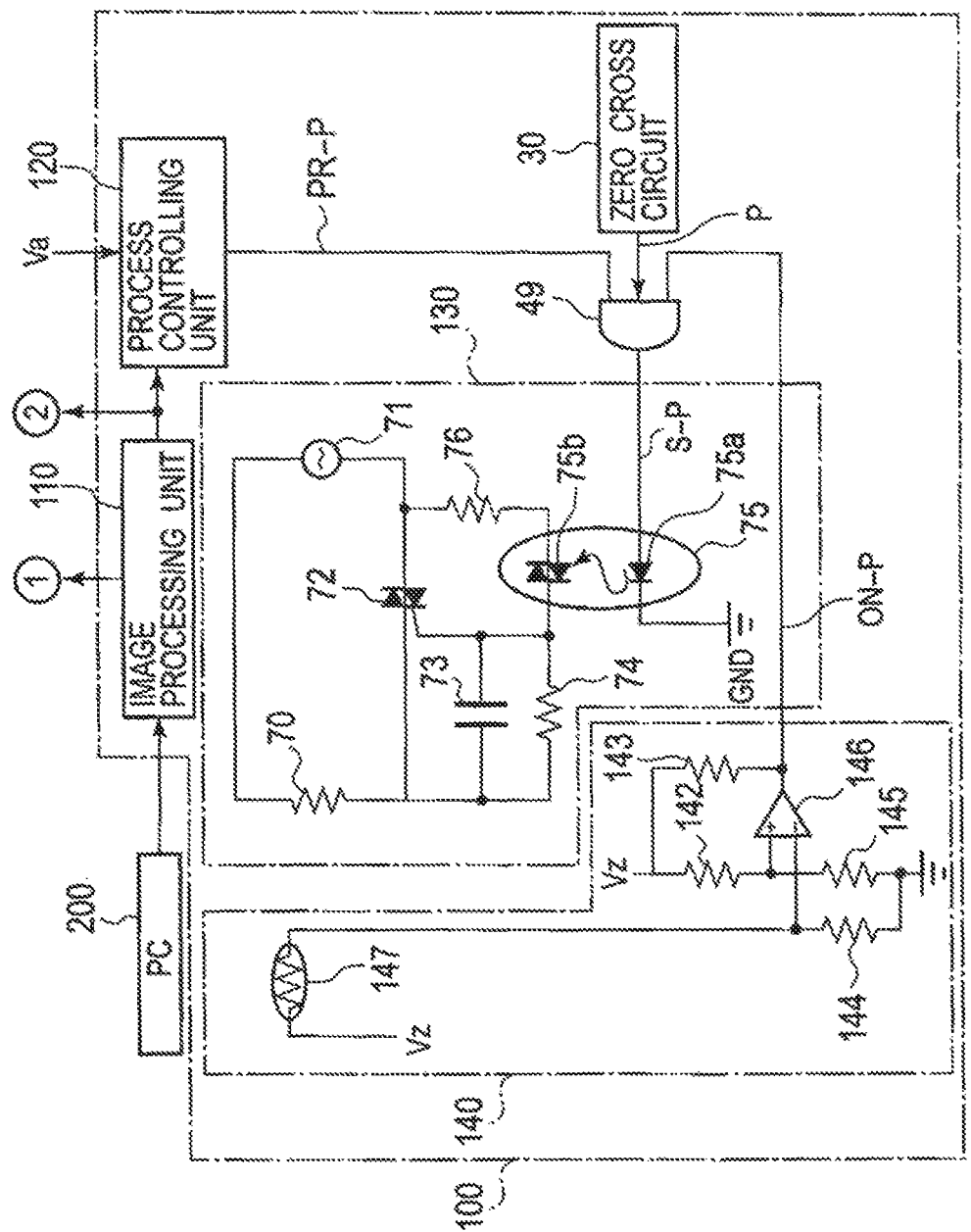
FIG. 6 is a circuit diagram of an image formation apparatus for explaining an application example of the power supply device of the first embodiment to the image formation apparatus.

FIG. 6 is a circuit diagram of the image formation apparatus for explaining the application example of the power supply device of the first embodiment in the image formation apparatus for a phase control in the image formation apparatus.

Electrophotographic printer 100 serving as an image formation apparatus includes a printer engine (not shown) including: a developer image formation device; an image transfer device; and a fixation device. The developer image formation device charges an image carrier such as a photosensitive drum by means of a charging device, selectively emits light according to print information to the charged image carrier (the charged photosensitive drum) by means of an optical exposure device thereby forming an electrostatic latent image on the image carrier, and attaches developer such as toner to the electrostatic latent image by means of a development device thereby forming a developer image such as a toner image on the image carrier. The image transfer device transfers the developer image from the image carrier onto a recording medium such as a paper sheet. The fixation device fixes the developer image to the recording medium by heating the recording medium having the developer image thereon by means of a heater.

For a phase control to turn on the heater of the fixation device in the image formation apparatus 100, zero cross signal P output from zero cross controller 40 in FIG. 2 is used as a reference for timing when heater control circuit 130 in FIG. 6 turns on the heater.

That is, in this application example, zero cross controller 40 (FIG. 2) further comprises control signal creating unit 49 (see, dotted line in FIG. 2), for the phase control to turn on the heater of the fixation device in image formation apparatus 100. More specifically, as shown in FIG. 2, zero cross controller 40 according to the application example comprises CPU 41 and has a function to calculate the zero cross timing based on zero cross signal P output from zero cross circuit 30 and, after a predetermined time, output switching signals P1 and P2 from output terminals OUT1 and OUT2, like zero cross controller 40 according to the first embodiment, and output control signal S-P (see FIG. 6) from control signal creating unit 49 (see, FIG. 6 and dotted line in FIG. 2).

The circuit configuration of the image formation apparatus will be described with reference to FIG. 6.

In the application example, as shown in FIG. 6, printer 100 serving as the image formation apparatus comprises: image processing unit 110; process controlling unit 120; heater control circuit 130; and temperature determination unit 140. Image processing unit 110 creates printable image data for printer 100 by converting image data attached to a print instruction transmitted from host PC 200 into the printable image data and monitors the completion and/or the status of the image formation process, the image transfer process, and the fixation process. The completion of the fixation process means the completion of the print process. Process controlling unit 120 controls processes including: the exposure process to emit light onto the image carrier (such as the photosensitive drum) thereby forming the electrostatic latent image on the image carrier; the development process to develop the developer image by supplying the developer to the electrostatic latent image; and the image transfer process to transfer the developer image from the image carrier to the print medium, in order to form the developer image corresponding to the image data created by image processing unit 110 on the print medium. Heater control circuit 130 serving as a fixation control unit controls the process of heating the print medium by means of heater 70 or a fixation part thereby fixing the developer image to the print medium. Temperature determination unit 140 monitors or detects the temperature of heater 70 and determines whether heating by means of heater 70 is needed. DC voltage Va is input to process controlling unit 120.

(Heater Control Circuit)

Next, heater control circuit 130 will be described in detail.

As shown in FIG. 6, heater control circuit 130 is a circuit to control the on/off operation of heater 70 of the fixation device, based on control signal S-P output from control signal creating unit 49 of zero cross controller 40.

In heater control circuit 130, energization of heater 70 connected to AC power source 71 is controlled by triac 72 being a bidirectional thyristor. A control circuit to create a control signal for turning on and off triac 72 is made up of capacitor 73, resisters 74, 76, and phototriac 75 for controlling the control signal. Phototriac 75 includes photodiode 75a provided at its input side and driven by control signal S-P and phototriac body 75b whose on/off state is controlled by light emitted from photodiode 75a.

With this configuration, after the predetermined time from when zero cross signal P output from zero cross circuit 30 is input to zero cross controller 40 (see FIG. 2), zero cross controller 40 outputs control signal S-P to drive phototriac 75 based on the rising edge and the falling edge of zero cross signal P. Then, control signal S-P drives photodiode 75a in phototriac 75 to emit light, which executes the on/off operation of phototriac body 75b. This controls the on/off state of triac 72 with capacitor 73, resisters 74 and 76, and phototriac 75, which controls the supply of the power to heater 70 with AC power source 71. This operation prevents the incoming current to heater 70 from becoming excessively large.

Note that although switch units 20 and 50 in FIG. 1 are formed of relays 21 and 51 in FIG. 2, switch units 20 and 50 may be formed of other switching elements such as a phototriac or etc.

(Temperature Determination Unit)

Next, the configuration of temperature determination unit 140 shown in FIG. 6 will be described. Temperature determination unit 140 includes thermistor 147 as a temperature detector, resistor 142, resistor 143, resistor 144, resistor 145, and comparator 146. One end of thermistor 147 is connected to power source Vz and the other end of thermistor 147 is connected to one end of resistor 144 and an inverting input terminal of comparator 146. The other end of resistor 144 is connected to ground GND. One end of resistor 142 is connected to power source Vz and the other end of resistor 142 is connected to a non-inverting input terminal of comparator 146 and one end of resistor 145. The other end of resistor 145 is connected to ground GND. One end of resistor 143 is connected to power source Vz and the other end of resistor 143 is connected to an output terminal of comparator 146.

With this configuration, the output terminal of comparator 146 outputs heater-on signal ON-P of H lever to turn on if the temperature of heater 70 is less than a predetermined value, while outputting heater-on signal ON-P of L level to turn off unless the temperature of heater 70 is less than the predetermined value.

(Operation of Image Formation Apparatus)

General operation of the image formation apparatus will be described with reference to FIGS. 2 and 6 with FIG. 5.

As shown in FIG. 6, when printer 100 receives a print instruction with image data transmitted from host PC 200, image processing unit 110 inputs print instruction reception command C1 (see, reference numeral ① in FIGS. 2 and 6) to zero cross controller 40.

In the application example, print instruction reception command C1 is received at time T0 (see FIG. 5).

Next, when predetermined time "a" lapses after print instruction reception command C1 is received (see time T1 in FIG. 5), zero cross controller 40 outputs switching signal P1 of "H" (High) from output terminal OUT1 of CPU 41 to relay 21. At the time, relay 21 is thus turned on, which initiates outputting of zero cross signal P.

Next, when predetermined time "b" lapses after the start of outputting of zero cross signal P (see, time T2 in FIG. 5), image processing unit 110 transmits, to process controlling unit 120, printable image data, which is converted by image processing unit 110 from the image data attached to the print instruction transmitted from host PC 200 and also inputs, to zero cross controller 40, process execution command C3 (see, reference numeral ② in FIGS. 2 and 6). When zero cross controller 40 receives process execution command C3, zero cross controller 40 outputs switching signal P2 of "H" from output terminal OUT2 of CPU 41 to relay 51. At a point when switching signal P2 is turned to "H" and zero cross signal P is "H", output of DC voltage Va is started and thus DC voltage Va is supplied to process controlling unit 120.

Next, when image processing unit 110 determines that the printing process, which is a series of process including the image formation process and the fixation process, is completed, that is, when image processing unit 110 determines that one job is completed and no another job exists, print completion command C3 (see, reference numeral 2 in FIGS. 2 and 6) is input to zero cross controller 40 (see, time T3 in FIG. 5).

When zero cross controller 40 receives print completion command C3, zero cross controller 40 outputs switching signal P2 of "L" (Low) from output terminal OUT2 of CPU 41 to relay 51. At a point when switching signal P2 is turned to "L" and zero cross signal P is "H", the output of DC voltage Va ends.

Next, when predetermined time "d" lapses after the end of output of DC voltage Va (see time T4 in FIG. 5), zero cross controller 40 outputs switching signal P1 of "L" from output terminal OUT1 of CPU 41 to relay 21, which turns off relay 21 and stops the output of zero cross signal P.

As described above, as the output of zero cross signal P during predetermined time "c" is required temporarily, the supply of power to zero cross circuit 30 is not provided before and after duration "c" (before time T1 and after time T4). With this operation, the power saving effect is obtained.

(Heater Control Signal Creating Unit)

Heater control signal creating unit 49 will be described with reference to FIGS. 2, 6, and 7. More specifically, the controlling of heater 70 serving as the fixation part when DC voltage Va is supplied to process controlling unit 120 during predetermined time "c" from time T2 to time T3 in FIG. 5 will be described.

As shown in FIG. 2, zero cross controller 40 includes heater control signal creating unit 49 in the application example. Heater control signal creating unit 49 creates heater control signal S-P for controlling heater 70 on the basis of zero cross signal P from zero cross circuit 30, process execution signal PR-P from process controlling unit 120, and heater-on signal ON-P from comparator 146 of temperature determination unit 140.

Figure 7:
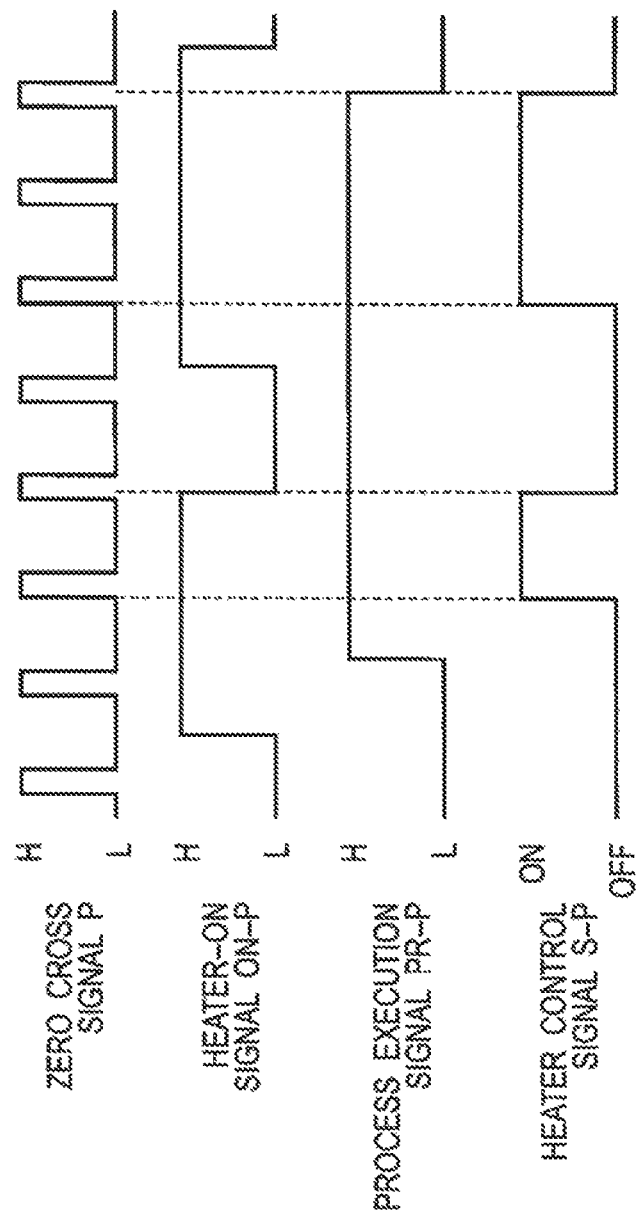
FIG. 7 is a time chart illustrating a relationship among the waveforms of signals in the application example.

Here, as shown in FIG. 7, heater control signal creating unit 49 turns heater control signal S-P to "ON" when both process execution signal PR-P and heater-on signal ON-P are "H" (High) and zero cross signal P is "H" (High), whereas heater control signal creating unit 49 turns heater control signal S-P to "OFF" when at least one of process execution signal PR-P and heater-on signal ON-P is "L" (Low) and zero cross signal P is "H" (High), so as to control the output light of photodiode 75a. The light output from photodiode 75a is received by phototriac body 75b in phototriac 75, which turns on triac 72 via capacitor 73 and resistors 74 and 76, thereby supplying electric power from AC power source 71 to heater 70. Therefore, heater 70 is turned on while preventing excessively large incoming current to heater 70.

(Effect of First Embodiment)

According to the first embodiment, the power supply device includes: the power supply part (60) to convert AC voltage supplied from the AC power source (10) into DC and output the DC voltage; the zero cross circuit (30) to detect the zero cross timing of the AC voltage, and output the zero cross signal (P); the zero cross controller (40) to output the first switching signal (P2) and the second switching signal (P1) at the predetermined time(s) based on the zero cross signal (P); the first switch unit (50) to execute the on/off operation based on the first switching signal (P2) thereby switching between supplying and not supplying the AC voltage to the power supply part (60); and the second switch unit (20) to execute the on/off operation based on the second switching signal (P1) thereby switching between supplying and not supplying AC voltage to the zero cross circuit (30).

The zero cross controller (40) stops supplying the AC voltage to the power supply part (60) by controlling the on/off operation of the first switch unit (50) using the first switching signal (P2) and, after that, stops supplying the AC voltage to the zero cross circuit (30) by controlling the on/off operation of the second switch unit (20) using the second switching signal (P1).

Therefore, in the first embodiment, second switching unit (20) switches between supplying and not supplying electric power to the zero cross circuit (30). Thus, when electric power to the zero cross circuit (30) is not needed, the first embodiment shuts off the supply of the power to the zero cross circuit (30), which eliminates fruitless power consumption in zero cross circuit 30.

According to the application example of the first embodiment, the image formation apparatus includes the power supply device according to the first embodiment and controls the image formation process on the recording medium based on the zero cross signal (P) and/or the DC voltage. Therefore, the image formation apparatus can achieve the same or similar effect as the power supply device of the first embodiment.

(Comparison Example)

In the power supply device, as a comparison example, disclosed in Japanese Patent Application Laid-Open No. 2009-4091, an AC voltage of an AC power source connected to an input terminal of a photo coupler turns on and off a light-emitting element (for example, photodiode) in the photo coupler, which turns on and off a light-receiving element (for example, phototransistor) in the photo coupler thereby outputting a signal as a zero cross signal formed of a pulse at a constant frequency.

That is, since the amount of luminescence of the photodiode varies in proportion to the AC voltage of the AC power source, the luminescence amount of the photodiode acquires a value that can not turn on the phototransistor when the absolute value of the AC voltage goes to less than a certain value. Thereby the output terminal of the photo coupler outputs the zero cross signal.

The comparison example outputs the zero cross signal all the time. In contrast to the comparison example, the first embodiment shuts off the supply of the power to zero cross circuit 30 which outputs zero cross signal P when it is unnecessary. Therefore, the first embodiment reduces the power consumption.

[Second Embodiment]

(Configuration of Second Embodiment)

Figure 8:
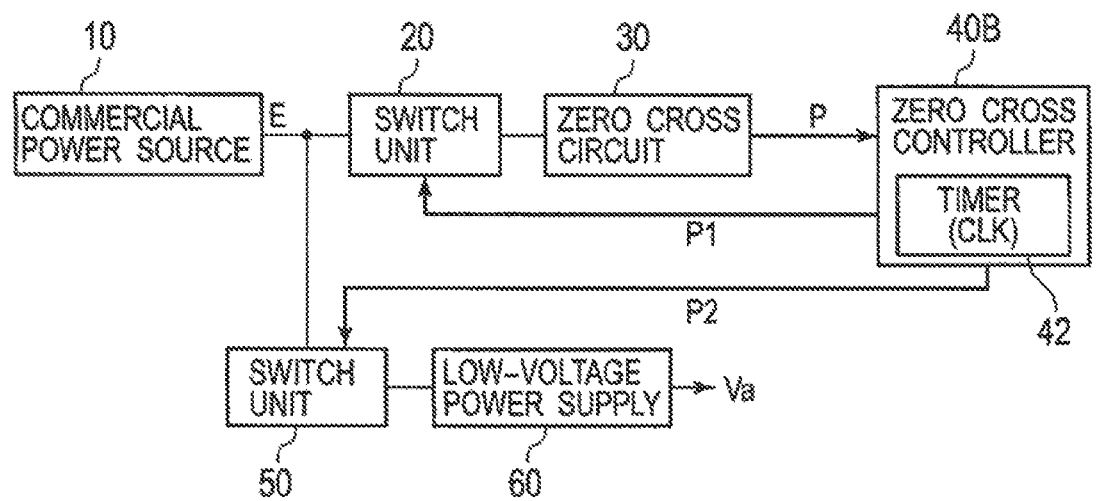
FIG. 8 is a block diagram illustrating the configuration of a power supply device according to a second embodiment of the invention.

FIG. 8 is a block diagram illustrating the configuration of a power supply device according to a second embodiment of the invention. In FIG. 8, the same constituents as in the power supply device of the first embodiment shown in FIG. 1 are designated by the same reference numerals.

The power supply device according to the second embodiment has zero cross controller 40B whose configuration is different from zero cross controller 40, instead of zero cross controller 40 in FIG. 1. Zero cross controller 40B includes clock generating unit (for example, timer) 42 to generate clock CLK having a predetermined cycle. Zero cross controller 40B is configured to synchronize clock CLK with the zero cross timing based on zero cross signal P output from zero cross circuit 30, output first switching signal P2 for controlling the on/off operation of switch unit 50 at a timing of clock CLK that is synchronized with the zero cross timing, and output second switching signal P1 for controlling the on/off operation of switch unit 20 at a timing of zero cross signal P. The other configurations are the same as those in the power supply device of the first embodiment shown in FIG. 1.

Figure 9:
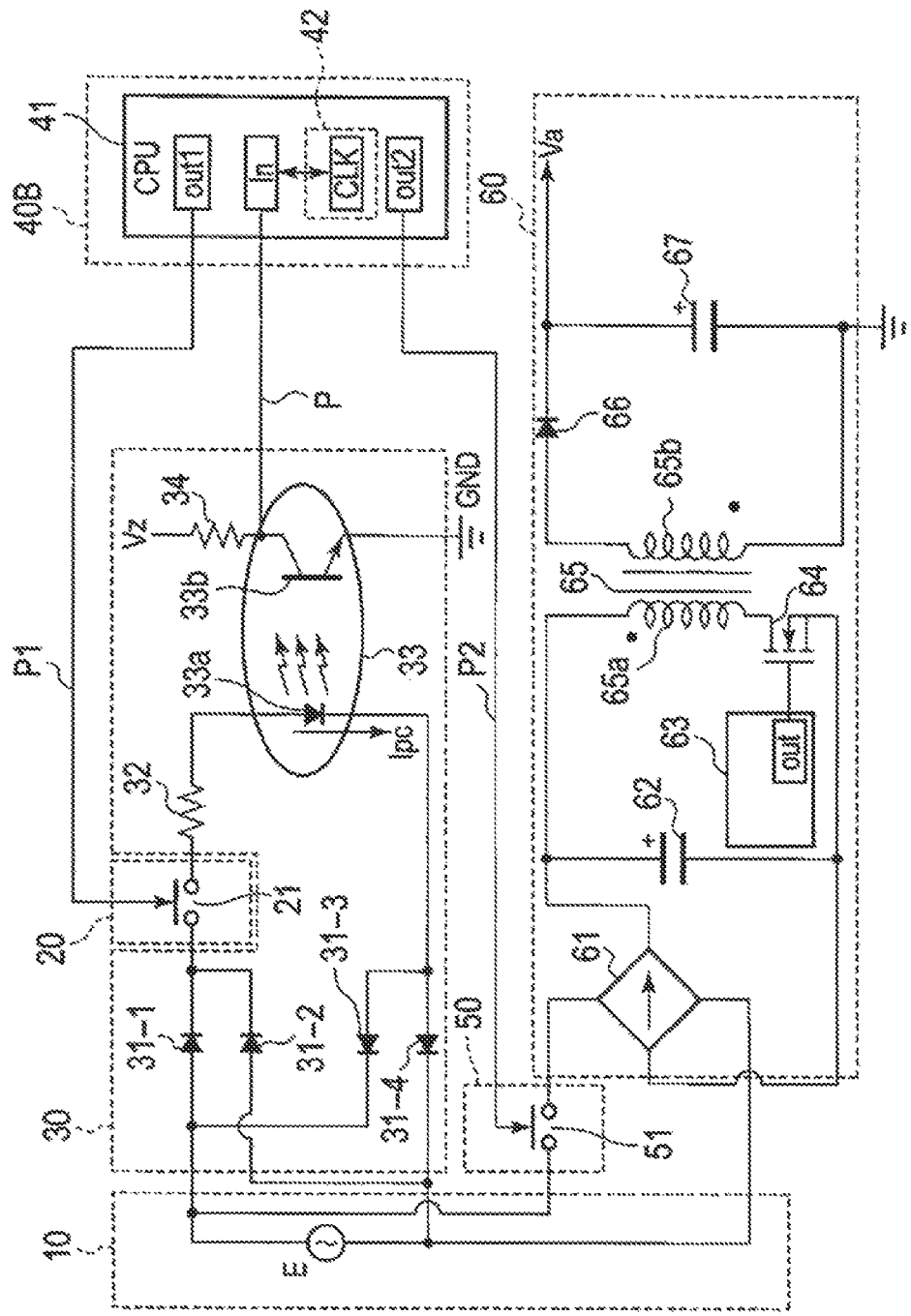
FIG. 9 is a circuit diagram illustrating an example of the configuration of the power supply device shown in FIG. 8

FIG. 9 is a circuit diagram illustrating an example of the configuration of the power supply device of FIG. 8. In FIG. 9, the same constituents as in the power supply device of the first embodiment shown in FIG. 2 are designated by the same reference numerals.

Zero cross controller 40B includes CPU 41 having arithmetic and control functions, timer 42 to generate clock CLK having the predetermined cycle, and the like. Zero cross controller 40B receives zero cross signal P output from zero cross circuit 30 by input terminal In, synchronizes clock CLK with the zero cross timing based on zero cross signal P, outputs first switching signal P2 for controlling the on/off operation of switch unit 50 from output terminal OUT2 at the timing of clock CLK that is synchronized with the zero cross timing, and outputs second switching signal P1 for controlling the on/off operation of switch unit 20 from output terminal OUT1 at the timing of zero cross signal P. The other configurations are the same as those in the power supply device of the first embodiment shown in FIG. 2.

(Operation of Power Supply Device of Second Embodiment)

FIG. 10 is a timechart illustrating the detailed operation in the power supply device of FIG. 9. In FIG. 10, the horizontal axis indicates time t and the vertical axis indicates a voltage.

Time T10: First, at time T10, a driving electric power is supplied from an illustrated power source such as a battery or the like to zero cross controller 40B, which causes timer 42 in zero cross controller 40B to start to operate.

Time T11: At time T11, CPU 41 in zero cross controller 40B outputs switching signal P1 of H level from output terminal OUT1, which turns on relay 21. Accordingly, AC voltage E is applied to zero cross circuit 30, which causes zero cross circuit 30 to detect zero cross signal P. Zero cross signal P is input to input terminal In of zero cross controller 40B.

Time T12: At time T12, CPU 41 compares input zero cross signal P with clock CLK generated by timer 42, synchronizes the time of clock CLK with the zero cross timing, and estimates the zero cross timing with clock CLK. After the completion of synchronizing of the zero cross timing, CPU 41 outputs switching signal P1 having L level from output terminal OUT1 to relay 21 to turn off relay 21, thereby shutting off the supply of the power from commercial power source 10 to zero cross circuit 30.

Time T13: At time T13, when the supply of the power to low-voltage power supply part 60 is needed, CPU 41 outputs switching signal P2 of H level from output terminal OUT2 based on the time of clock CLK that is synchronized with the zero cross timing, to turn on relay 51 and supply commercial power source 10 to low-voltage power supply part 60. More specifically, CPU 41 outputs switching signal P2 of H level from output terminal OUT2 when a phase angle of AC voltage E is small at the synchronized zero cross timing, so as to turn on relay 51. Therefore, while an incoming current from commercial power source 10 to low-voltage power supply part 60 is suppressed, AC voltage E is supplied to low-voltage power supply part 60 and thus low-voltage power supply part 60 outputs DC voltage Va.

Time T4: At time T14, when DC voltage Va output from low-voltage power supply part 60 is not needed any more, CPU 41 outputs switching signal P2 of L level from output terminal OUT2 based on the zero cross timing thereby turning off relay 51, which shuts off the supply of the power to low-voltage power supply.

After that, when the supply of the power to low-voltage power supply part 60 is needed again, the process proceeds back to the operation of time T13.

Note that timer 42 is provided in zero cross controller 40 in the embodiment, but may be provided outside of zero cross controller 40.

(Effect of Second Embodiment)

According to the second embodiment, the power supply device includes: the power supply part (60) to convert AC voltage supplied from the AC power source (10) into DC and output the DC voltage; the zero cross circuit (30) to receive the AC voltage, detect the zero cross timing of the AC voltage, and output the zero cross signal (P); the clock generating unit (42) to generate the clock (CLK) having a predetermined cycle; the zero cross controller (40B) to synchronize the clock (CLK) with the zero cross timing based on zero cross signal (P), output the first switching signal (P2) at a timing of the clock (CLK) that is synchronized with the zero cross timing, and output the second switching signal (P1) at a timing of zero cross signal P; the first switch unit (50) to execute the on/off operation based on the first switching signal (P2) thereby switching between supplying and not supplying the AC voltage to the power supply part (60); and the second switch unit (20) to execute the on/off operation based on the second switching signal (P1) thereby switching between supplying and not supplying the AC voltage to the zero cross circuit (30).

The zero cross controller (40B) stops supplying the AC voltage to the zero cross circuit (30) by controlling on/off operation of the second switch unit (20) using the second switching signal (P1) and, after that, stops supplying the AC voltage to the power supply part (60) by controlling on/off operation of the first switch unit (50) using the first switching signal (P2).

That is, according to the second embodiment, the zero cross controller (40B) estimates the zero cross timing based on the clock (CLK) output from the clock generating unit (42) and switches between supplying or not supplying electric power to the zero cross circuit (30) with the second switch unit (20). Therefore, the second embodiment can reduce the power consumption of the zero cross circuit (30) more than the first embodiment.

An image formation apparatus of the second embodiment includes the power supply device of the second embodiment and controls the process of forming an image on the recording medium based on the zero cross signal or the DC voltage. Therefore, the image formation apparatus of the second embodiment achieves the same effect as the power supply device of the second embodiment.

(Modifications of First and Second Embodiments)

The invention is not limited to the first and second embodiments and may be applied to various modifications or applications other than the above described embodiments and applications, which may include the following examples (I) and (II).

(I) Relays 21 and 51 are used as switch units 20 and 50 for switching between supplying and not supplying the electric power to zero cross circuit 30 and low-voltage power supply part 60 the first and second embodiments; but the switch units may be a switching element(s) other than a relay, such as or etc.

(II) Zero cross circuit 30, zero cross controllers 40 and 40B, and low-voltage power supply part 60 are not limited to the illustrated circuit configurations, and may have other circuit configurations. For example, timer 42 may be replaced with another clock generating unit such as an oscillator or etc.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A power supply device comprising:
a power supply part to convert an AC voltage of an AC power source into a direct current and output a DC voltage;
a zero cross detector to detect zero cross timings of the AC voltage and to output zero cross signals on the basis of the zero cross timings;
a power supply controller to control supply of the AC voltage to the power supply part and the zero cross detector, wherein the power supply controller controls the supply of the AC voltage to the power supply part and the zero cross detector based on the zero cross timing;
a clock generating unit to generate a clock of a specified period;
a first switching unit to switch between supplying and not supplying the AC voltage to the power supply part; and
a second switching unit to switch between supplying and not supplying the AC voltage to the zero cross detector,
wherein the power supply controller synchronizes the clock of the specified period with the zero cross timing to obtain a synchronized clock, and controls the supply of the AC voltage to the power supply part and the zero cross detector at a timing of the synchronized clock,
wherein the power supply controller controls the supply of the AC voltage to the power supply part with the first switching unit and controls the supply of the AC voltage to the zero cross detector with the second switching unit, and
wherein the power supply controller provides for the supply of power or stopping of the supply of power to the zero cross detector based on whether the second switching unit is switched on or is switched off,
wherein the power supply controller stops the supply of power to the zero cross detector after the clock has been synchronized with the zero cross timing,
wherein, after the power has been stopped from being supplied to the zero cross detector, the power supply controller controls the supply of power to the power supply part based on the synchronized clock,
wherein upon starting of supply of power to the power supply part after the stoppage of the power to the zero cross detector, the power supply controller starts supply of the power to the power supply part based on the synchronized clock while maintaining the stoppage of power to the zero cross detector, and
wherein upon stopping of supply of power to power supply part after the stoppage of the power to the zero cross detector, the power supply controller stops supply of the power to the power supply part based on the synchronized clock while maintaining the stoppage of power to the zero cross detector.

2. The power supply device according to claim 1, wherein the second switching unit is a switching element being one of a relay and a phototriac.

3. The power supply device according to claim 1, wherein the clock generating unit is a timer.

4. An image formation apparatus comprising:
the power supply device according to claim 1; and
a fixation part for fixing a developer image attached on a medium to the medium on the basis of the zero cross timing.

5. The image formation apparatus according to according to claim 4, further comprising:
a temperature detector to detect a temperature of the fixation part; and
a process controlling unit to control a process of forming the developer image on the medium;
the power supply controller includes a control signal creating unit to create a control signal for the fixation part on the basis of the zero cross timing and the temperature detected by the temperature detector.

6. The power supply device according to claim 1, wherein the zero cross detector includes a full wave rectifier.

7. The power supply device according to claim 6, wherein the full wave rectifier includes a first diode, a second diode, a third diode and a fourth diode.

8. The power supply device according to claim 1, wherein the power supply controller is configured to output a first switching signal and a second switching signal at a timing of the clock of the specified period that is synchronized with the zero cross timing, and
the power supply controller is configured to, after the clock of the specified period is synchronized with the zero cross timing, turn off the second switching unit by using the second switching signal thereby stopping the supply of the AC voltage to the zero cross detector, and then, control on and off operation of the first switching unit by using the first switching signal thereby turning on and off the AC voltage to the power supply.

9. The power supply device according to claim 1, wherein the power supply controller determines the zero cross timing using the clock of the specified period output from the clock generating unit, and
wherein the power supply controller controls the supply of the AC voltage to the power supply part and the zero cross detector in accordance with the zero cross timing.

10. The power supply device according to claim 1, wherein the second switching unit is switched on at a first time prior to a second time when the first switching unit is switched on, and the second switching unit is switched off at a third time between the first and second times, and wherein the second switching unit is kept off irrespective as to a time difference between the second time and a fourth time when the first switching unit is switched off.

11. The power supply device according to claim 1, wherein when the power to the power supply part is started again after the power to the power supply part is stopped, the power supply controller starts supply of the power to the power supply part based on the synchronized clock while maintaining stoppage of power to zero cross detector.

12. The power supply device according to claim 11, wherein all of the starting and stopping of power to the power supply part by the power supply controller is performed based solely on the synchronized clock.

13. The power supply device according to claim 1, wherein the supply of power to the zero cross detector is provided by a battery.

* * * * *